(12) United States Patent
Wang et al.

(10) Patent No.: US 12,164,854 B2
(45) Date of Patent: Dec. 10, 2024

(54) METHOD, NON-TRANSITORY COMPUTER-READABLE MEDIUM, AND APPARATUS FOR ARRANGING ELECTRICAL COMPONENTS WITHIN A SEMICONDUCTOR DEVICE

(71) Applicant: TAIWAN SEMICONDUCTOR MANUFACTURING COMPANY LTD., Hsinchu (TW)

(72) Inventors: Ting-Chi Wang, Hsinchu (TW);
Wai-Kei Mak, Hsinchu (TW);
Kuan-Yu Chen, Kaohsiung (TW);
Hsiu-Chu Hsu, Taichung (TW);
Hsuan-Han Liang, Kaohsiung (TW);
Sheng-Hsiung Chen, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 498 days.

(21) Appl. No.: 17/587,381

(22) Filed: Jan. 28, 2022

(65) Prior Publication Data
US 2023/0244845 A1 Aug. 3, 2023

(51) Int. Cl.
*G06F 30/392* (2020.01)
*G06F 30/327* (2020.01)
*G06F 30/396* (2020.01)

(52) U.S. Cl.
CPC .......... *G06F 30/392* (2020.01); *G06F 30/327* (2020.01); *G06F 30/396* (2020.01)

(58) Field of Classification Search
USPC .................. 716/118, 119, 124, 125, 126, 136
See application file for complete search history.

(56) References Cited

U.S. PATENT DOCUMENTS 7,624,366 B2 * 11/2009 Alpert .................. G06F 30/392
716/124
2015/0347644 A1 * 12/2015 Arakawa ............... G06F 30/327
716/105

* cited by examiner

*Primary Examiner* — Brian Ngo
(74) *Attorney, Agent, or Firm* — WPAT LAW; Anthony King

(57) ABSTRACT

The present disclosure provides a method and an apparatus for arranging electrical components within a semiconductor device, and a non-transitory computer-readable medium. The method includes (a) placing a plurality of cells in a first layout; (b) generating a second layout by performing a first set of calculations on the first layout such that a total wire length of the second layout is less than that of the first layout; (c) generating a third layout by performing a second set of calculations on the second layout such that cell congestions in the second layout is eliminated from the third layout; (d) generating a fourth layout by performing a third set of calculations on the third layout such that the total wire length of the fourth layout is less than that of the third layout; and (e) iterating the operations (c) and (d) until a target layout conforms to a convergence criterion.

20 Claims, 11 Drawing Sheets

METHOD, NON-TRANSITORY COMPUTER-READABLE MEDIUM, AND APPARATUS FOR ARRANGING ELECTRICAL COMPONENTS WITHIN A SEMICONDUCTOR DEVICE

BACKGROUND

Under present practice, layout of integrated circuitry (IC) can be simulated using automatic placement and routing (APR) tools. Conventional global placement (one step in the APR process) typically assumes that all cell rows in a design layout are of the same height. Nevertheless, a design layout comprising combined short-row and tall-row heights (i.e., mixed-row heights) can provide a feasible design for performance and area co-optimization in an advanced node. However, the mixed-row height design can increase time required to run the entire APR process. Therefore, an improved global placement that can reduce total operating time of the APR process is called for.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

Figure 1:
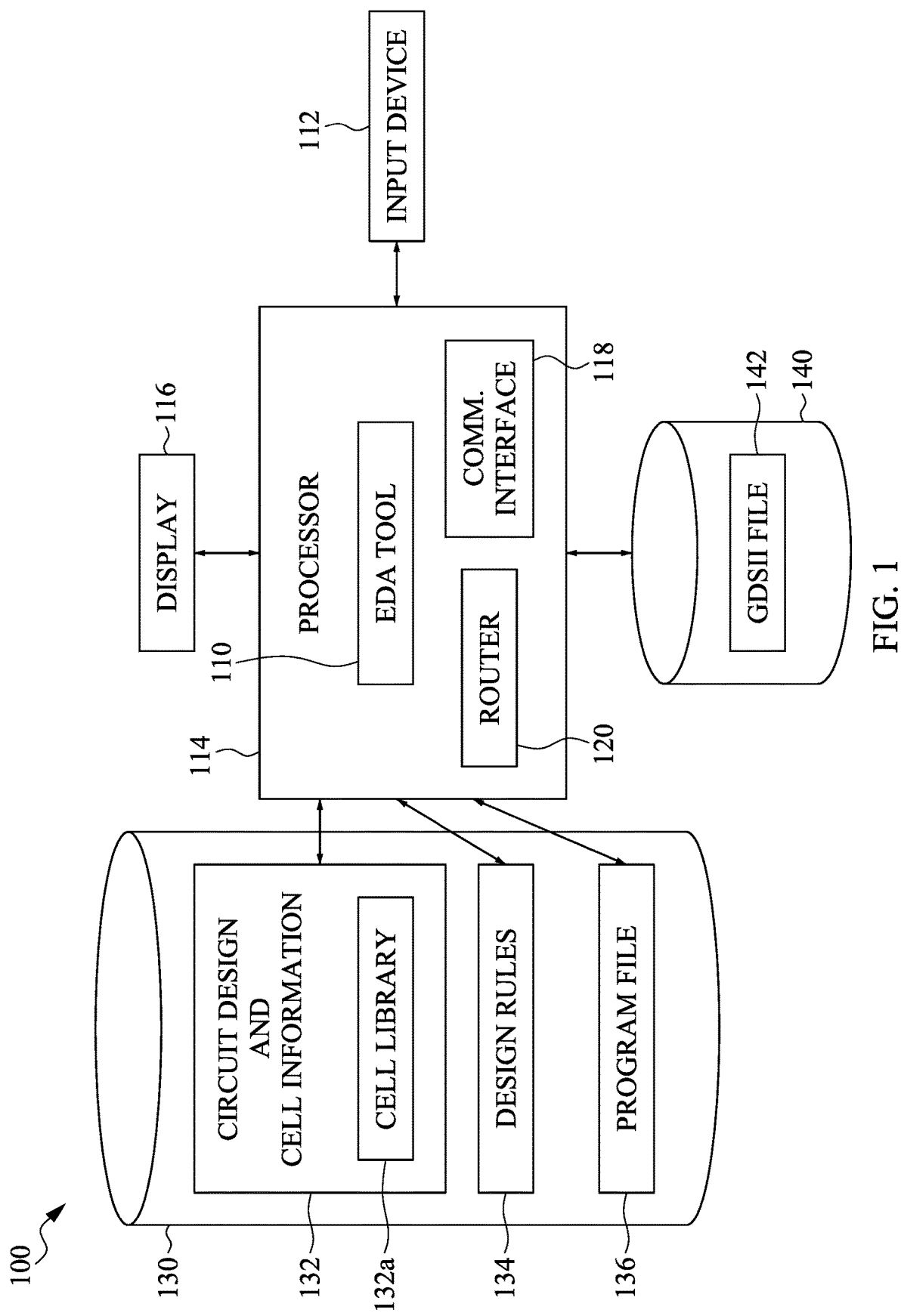
FIG. 1 is a diagram illustrating an electronic design automation system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram illustrating an electronic design automation system 100 in accordance with some embodiments. As shown in FIG. 1, system 100 includes an electronic design automation ("FDA") tool 110 having a place and route tool including a chip assembly router 120.

The EDA tool 110 is a special purpose computer configured to retrieve stored program instructions 136 from a computer readable storage medium 130 and 140 and execute the instructions on a general purpose processor 114. Processor 114 may be any central processing unit ("CPU"), microprocessor, micro-controller, or computational device or circuit for executing instructions. The non-transitory computer readable storage medium 130 and 140 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130 and 140 may store data input by a user such as a circuit design and cell information 132, which may include a cell library 132a, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 118 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels. The communications interface 118 may be a wired link and/or a wireless link coupled to a local area network (LAN) or a wide area network (WAN).

Router 120 is capable of receiving an identification of a plurality of cells to be included in a circuit layout, including a list 132 of pairs of cells. The plurality of cells can be connected to each other. In some embodiments, the list 132 can be selected from the cell library 132a. Design rules 134 may be used for a variety of processing technologies. In some embodiments, the design rules 134 configure the router 120 to locate connecting lines and vias on a manufacturing grid. Other embodiments may allow the router to include off-grid connecting lines and/or vias in the layout.

Figure 2:
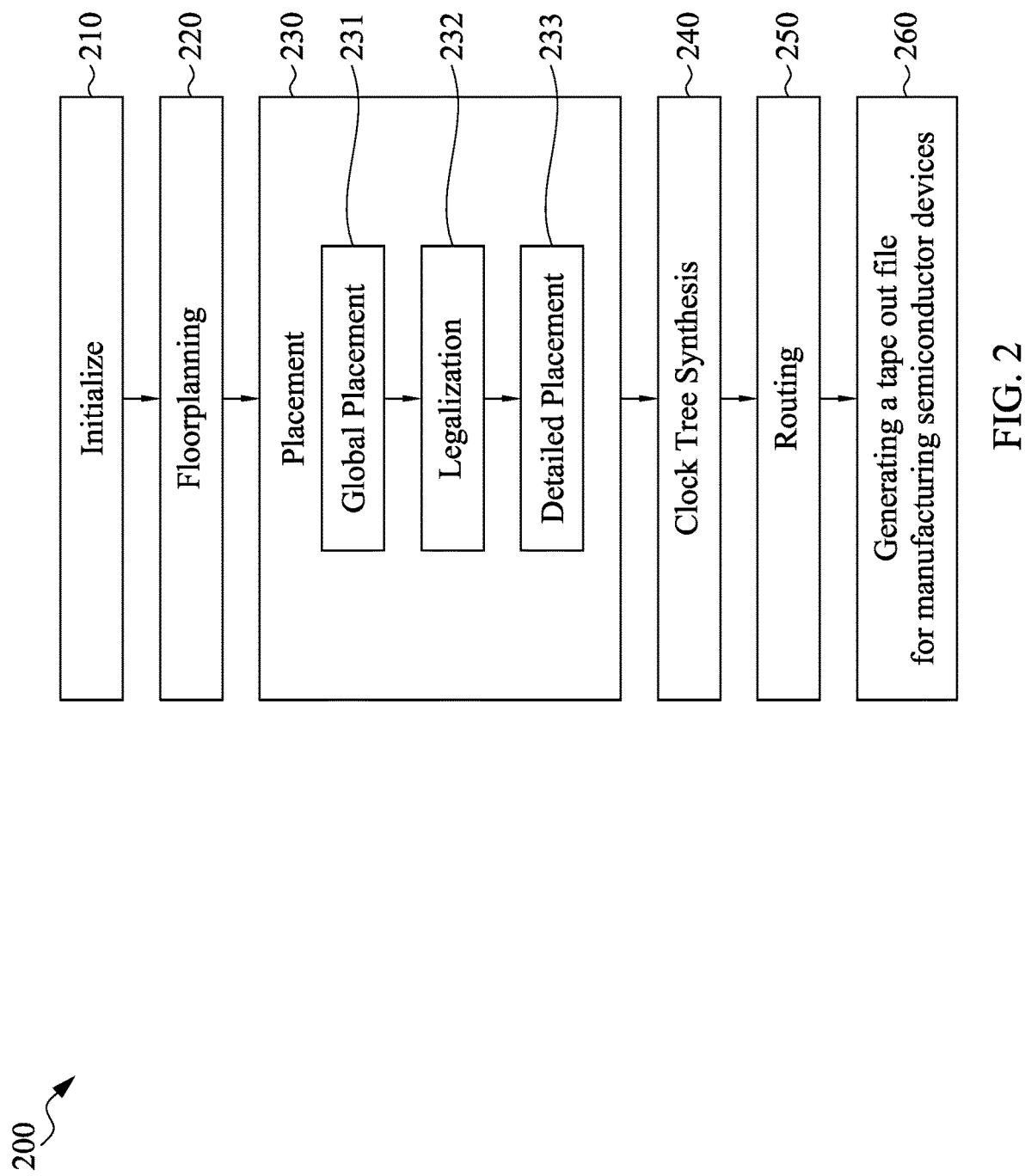
FIG. 2 is a flowchart showing a method for generating a simulated integrated circuit design layout, in accordance with some embodiments of the present disclosure.

FIG. 2 is a flowchart 200 showing a method for generating a simulated integrated circuit design layout, in accordance with some embodiments of the present disclosure. In some embodiments, this method may correspond to an automatic placement and routing (APR) process. In some embodiments, the APR process of the present disclosure may be applied to any suitable simulated integrated circuit design layout.

The APR process shown in FIG. 2 may begin in operation 210, initializing a pre-placement of a simulated integrated circuit design layout. For example, the pre-placement simulation may be generated according to design data corresponding to an integrated circuit layout stored in a data storage device. In some embodiments, the pre-placement simulation may be executed on the design, e.g., by an EDA tool, to determine whether the design meets a predetermined specification, if the design does not meet the predetermined specification, the semiconductor device is redesigned. In some embodiments, a SPICE simulation is performed on the SPICE netlist. Other simulation tools can be employed, in place of or in addition to the SPICE simulation, in other embodiments.

In operation 220, floor planning for the integrated circuit is performed, for example, by system 100. In some embodiments, floor planning includes dividing a circuit into functional blocks, which are portions of the circuit, and identifying the layout for these functional blocks.

In operation 230, an automated placement tool may create a transistor level design by placing cells from a cell library to form the various logic and functional blocks according to the IC design. In some embodiments, the system 100 performs placement for the integrated circuit. In some embodiments, operation 230 includes determining the placement for the electronic components, circuitry, and logic elements. For example, the placement of the transistors, resistors, inductors, logic gates, and other elements of the integrated circuit can be selected in operation 230.

In some embodiments, operation 230 can include sub-operations of global placement 231, legalization 232, and detailed placement 233.

Global placement 231 is a rough placement of the simulated integrated circuit design layout. In some embodiments, global placement 231 may include distributing, the cells in the simulated integrated circuit design layout with overlaps. During global placement 231, a placement tool can be used to generate an automatic placement of the cells with approximately regular cell densities while minimizing wire length. Global placement 231 can utilize partitioning-based techniques, simulated annealing-based techniques, analytical placement techniques, or any combination thereof. In some embodiments, the simulated integrated circuit design layout includes cells arranged in rows. In one embodiment, the cell rows in the simulated integrated circuit design layout can be of the same height. In another embodiment, the cell rows in the simulated integrated circuit design layout can be of different heights.

After global placement 231, cells may still overlap and be misaligned with the rows. To remedy the overlap and misalignment, legalization 232 includes removing any remaining overlaps between the cells and aligning all the cells in the simulated integrated circuit design layout. That is, legalization 232 legalizes global placement 231. In other words, legalization 232 places cells at legal placement sites and removes overlaps. Therefore, legalization 232 removes white spaces in the simulated integrated circuit design layout.

Detailed placement 233 further improves wire length (or other problems) by locally rearranging the cells while maintaining legality. That is, the detailed placement 233 provides a final placement based on the legality and wire length.

In operation 240, Clock Tree Synthesis (CTS) may be performed after the placement of cells. In some embodiments, a CTS tool synthesizes a clock tree for the entire simulated integrated circuit design layout. As it does so, the CTS tool establishes only an approximate position for each buffer forming the clock tree and only approximates the routing of signal paths that will link the buffers to one another and to synchronization, so that it can make reasonably accurate estimates of signal path delays through the clock tree.

In operation 250, an automatic routing tool then determines the connections needed between the devices in the cells, such as MOS transistors. Multiple transistors are coupled together to form functional blocks, such as adders, multiplexers, registers, and the like, in the routing step. Routing comprises the placement of signal net wires on a metal layer within placed cells to carry non-power signals between different functional blocks. In some embodiments, signal net wires are routed on the same metal level as one of the vertically adjacent metal layers in the multilevel power rails.

Once the routing is determined, automated layout tools are used to map the cells and the interconnections from the router onto a semiconductor device using the process rules and the design rules, as provided. All of these software tools are available commercially for purchase. Cell libraries that are parameterized for certain semiconductor wafer manufacturing facilities are also available.

In operation 260, a tape out data file corresponding to an integrated circuit layout of a semiconductor device may be generated. In some embodiments, the integrated circuit design layouts can include FinFET devices and/or other planar or more complex structural semiconductor manufacturing processes.

Figure 3:
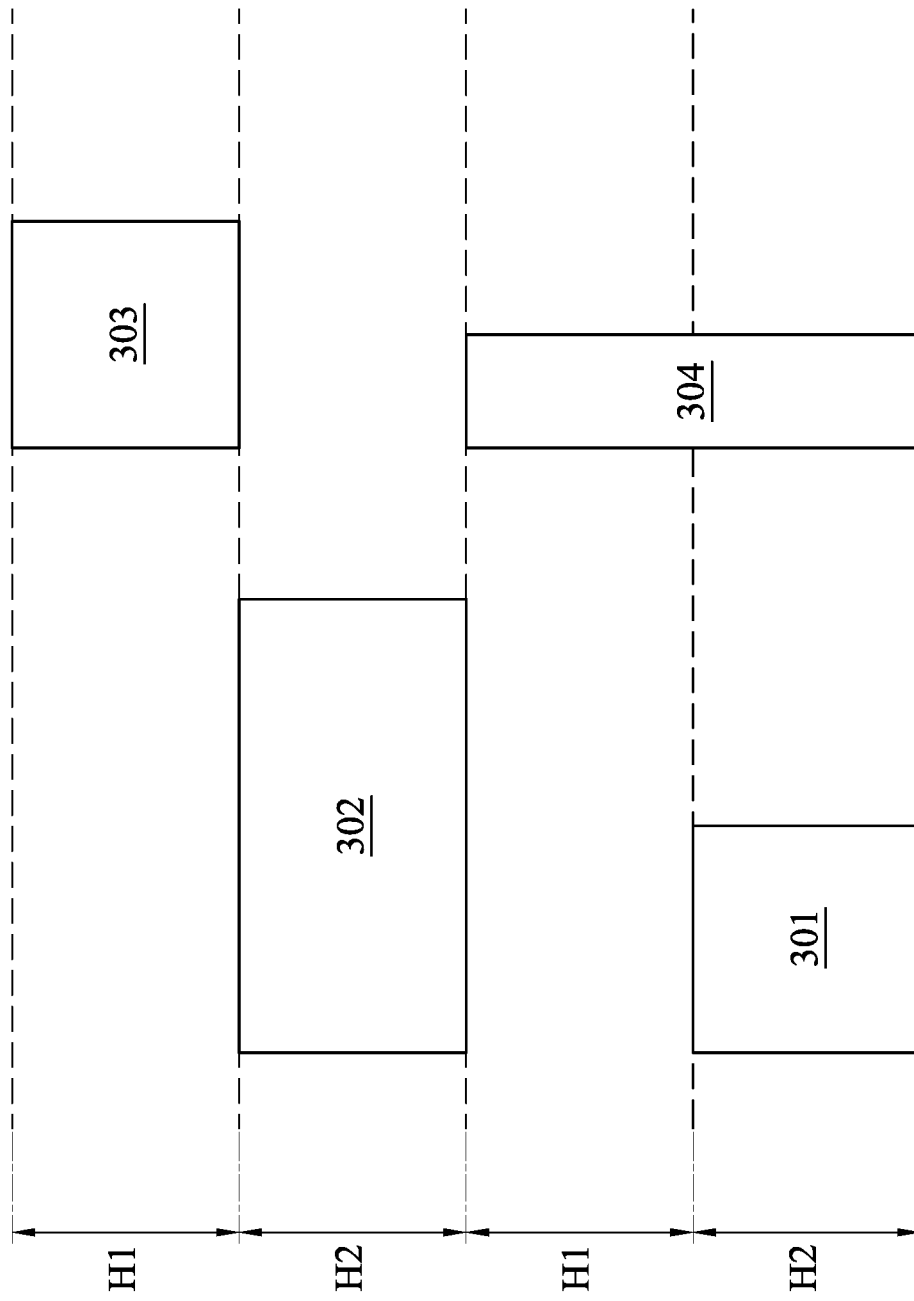
FIG. 3 is a top view of a simulated integrated circuit design layout, in accordance with some embodiments of the present disclosure.

FIG. 3 is a top view of a simulated integrated circuit design layout, in accordance with some embodiments of the present disclosure. The simulated IC design layout in FIG. 3 has row heights H1 and H2. Referring to FIG. 3, the cells 301, 302, 303, and 304 can be provided in the simulated IC design layout.

Row height H1 may be identical to or different from row height H2, For example, the row height H1 can be greater than the row height H2. In some embodiments, the rows of height H1 may be tall-row height and the rows with row height H2 may be short-row height. In some embodiments, the simulated IC design layout can have tall-row and short-row heights alternately arranged.

The cell library includes multiple versions of each cell. For example, the simulated IC design layout may have four cell versions 301, 302, 303, and 304. In some embodiments, the cell 301 is a general standard cell. The cell 301 can have a cell height H2. The cell 301 may be a low-driving cell. The cell 301 can be referred to as a short low-driving (SL) cell version in the present disclosure.

In some embodiments, the cell 302 can be of a height identical to that of cell 301. Cell 302 can be of a different width from cell 301. In one embodiment, the width of the cell 302 can exceed that of the cell 301. For example, the width of the cell 302 can be twice the width of the cell 301. The cell 302 can have a cell height H2. In some embodiments, the cell 302 may be a high-driving cell. The cell 302 can be referred to as a short high-driving (SH) cell version in the present disclosure.

In some embodiments, the cell 303 can be of a width identical to that of the cell 301. The cell 303 can be of a different height from cell 301. In one embodiment, height of cell 303 can exceed that height of the cell 301. The cell 302 can have a cell height H1. For example, the height of the cell 303 can be twice the height of the cell 301. That is, the cell height H1 may be twice the cell height H2. In some embodiments, the cell 303 may be a high-driving cell. The cell 303 can be referred to as a TALL cell version in the present disclosure.

In some embodiments, the cell 304 can be of a width different from that of the cell 301. For example, the width of the cell 304 can be less than that of the cell 301. In some embodiments, the cell 304 can be of a height different from that of the cell 301. In one embodiment, the height of the cell 304 can be greater than the height of the cell 301. In another embodiment, the height of the cell 304 can be greater than the height of the cell 303. That is, the height of the cell 304 can be greater than the cell heights H1 and H2, The cell 304 can have a cell height equal to a sum of the cell height H1 and H2. In some embodiments, the cell 304 may be a high-driving cell. The cell 304 can be referred to as a double-row-height (DR) cell version in the present disclosure.

In one embodiment, a low-driving cell can be converted to any of the cell versions 301, 302, 303, and 304. In another embodiment, a high-driving cell can be converted to any of the cell versions 302, 303, and 304. The cell can be converted according to need. In some embodiments, the simulated. IC design layout can include standard cells of short-row height, tall-row height and mixed-row (short and tall rows) height. As the technology evolves, the simulated IC design layout can have multiple cell versions (for example, cell versions 301, 302, 303, and 304) therein for better performance and flexibility.

Figure 4:
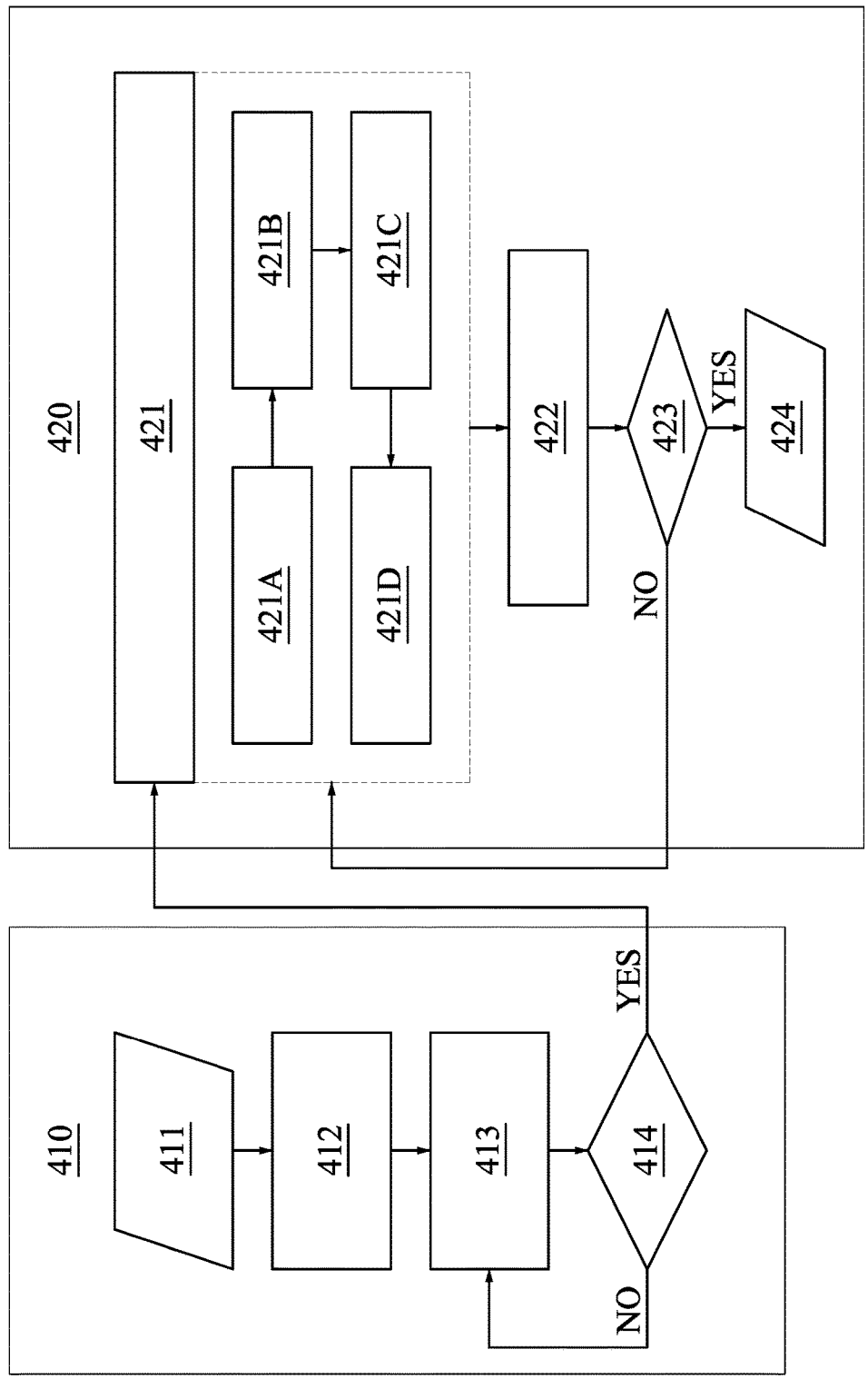
FIG. 4 is a flowchart showing a method for generating a global placement of a simulated integrated circuit design layout, in accordance with some embodiments of the present disclosure.

FIG. 4 is a flowchart 400 showing a method for generating a global placement of a simulated integrated circuit design layout, in accordance with some embodiments of the present disclosure. In some embodiments, this method may be a part of the APR process. For example, the details of this method may be a portion of the operation 231 in FIG. 2.

As shown in FIG. 4, the method 400 includes initial placement 410 and refinement placement 420 stages. The initial placement 410 stage includes operations 411, 412, 413, and 414. The refinement placement 420 stage includes operations 421, 422, 423, and 424, wherein operation 421 includes steps 421A, 421B, 421C, and 421C.

In operation 411, the circuit information is provided for generating a simulated IC design layout.

In operation 412, a simulated. IC design layout is generated based on the circuit information. The simulated IC design layout includes one or more cells therein. In other words, one or more cells can be placed in the simulated IC design layout according to the circuit information. In some embodiments, the simulated IC design layout includes cells of short-row height, tall-row height, or mixed-row height. In some embodiments, the simulated IC design layout can be generated based on the hybrid model, which can get the positions of net connections between cells. In some embodiments, the hybrid model can combine multiple kinds of net models. For example, the hybrid model can combine two kinds of net models, such as clique model and star model.

In the global placement stage, the objective is to select the physical positions of cells and reduce congestion between cells for minimizing wire length as much as possible. In some embodiments, the wire length can be determined by a Half-Perimeter Wirelength (HPWL) method. In some embodiments, the HPWL method can be expressed by Eq. 1 as follows.

$$HPWL(x, y) = \sum_{e \in E}\left[\max_{i \in e} x_i - \min_{i \in e} x_i + \max_{i \in e} y_i - \min_{i \in e} y_i\right], \quad [\text{Eq. 1}]$$

which $E=\{e_1, e_2, \ldots e_{|E|}\}$ represents the set of nets (i.e., connections of cells in the simulated IC design layout); the vector $x=\{x_1, x_2, \ldots x_{|V|}\}$ and the vector $y=\{y_1, y_2, \ldots y_{|V|}\}$ represents the x-coordinates and y-coordinates of cells.

In operation 413, an updated simulated IC design layout is generated by performing a set of calculations on the simulated IC design layout generated in operation 412. In some embodiments, the calculations are performed on the simulated layout to reduce a total wire length thereof. That is, a total wire length of the simulated IC design layout generated in operation 413 is less than that of the simulated IC design layout generated in operation 412. In other words, operation 413 adjusts the simulated IC design layout to reduce total wire length thereof. In some embodiments, the simulated IC design layout can be adjusted utilizing the bounding-to-bounding (B2B) model to update the connection to reduce wire length.

In operation 414, the total wire length of the simulated IC design layout is determined. If the total wire length of the simulated IC design layout generated in operation 413 is below a predetermined threshold, the simulated IC design layout can be obtained. If the total wire length of the simulated IC design layout generated in operation 413 exceeds the predetermined threshold, operation 413 can be performed again. The operation 413 may be iterated until the total wire length of the simulated IC design layout meets the predetermined threshold. That is, operation 413 can be repeated until a converged wire length is obtained. For example, operation 413 can be performed four times to obtain a converged wire length. In some embodiments, the wire length can be determined by the HPWL method.

Referring to FIG. 4, after the initial placement 410 stage is completed, the simulated IC design layout can be passed to the refinement placement 420 stage for further processing. The refinement placement 420 stage can include operations 421, 422, 423, 424, and 425, wherein operation 421 includes steps 421A, 421B, 421C, and 421C.

In operation 421, an updated simulated IC design layout can be generated by a set of calculations on the simulated IC design layout generated in the initial placement 410, such that cell congestions therein can be eliminated. That is, in the updated simulated IC design layout generated in operation 421, the cell congestions of the simulated IC design layout generated in operation 413 are eliminated. In some embodiments, calculations in operation 421 are intended to legalize the simulated IC design layout. Accordingly, operation 421 can be known as look-ahead legalization (LAL).

In some embodiments, operation 421 can be divided into four steps 421A, 421B, 421C, and 421D.

In step 421A, congestion status of the simulated IC design layout can be identified. In some embodiments, the simulated IC design layout can be divided into multiple regions, with each analyzed to determine whether it meets a congestion criterion. In one embodiment, each of the regions can include one cell. In other words, the size of the region is identical to the cell. In some embodiments, each region can include a plurality of cells. When a region meets the congestion criterion, such region is identified as a congested region. Accordingly, the congestion status of the simulated IC design layout can be determined.

In step 421B, a window is determined based on the congested region. In some embodiments, the window can include one or more regions. According to the congested region identified in step 421A, the window including the congested region can be determined. In some embodiments, the window including the congested region is a simulated area for eliminating the congestion status therein. The window can have a suitable size to spread the cells inside within the window to eliminate the congestion status.

In step 421C, the cells can be rearranged into the regions of the window. According to the congested region identified in step 421A, the cells in the window including the congested region can be rearranged in the window evenly. In some embodiments, the window is a simulated area in which cells are rearranged so that the congestion status of the window can be alleviated. In some embodiments, the window can be divided into sub-windows, and the cells can be evenly rearranged therein. In some embodiments, a position sequence of the cells for rearranging the cells into the sub-windows can be determined. Therefore, the cells can be rearranged into the sub-windows based on the position sequence evenly. In some embodiments, the sub-window can have a size identical to that of the region. That is, the cells can be rearranged into the regions of the window. Detailed description of step 421C may be found in FIGS. 7A-7D.

In step 421D, the cells within each region (sub-window) can be rearranged evenly therein. After the cells are rearranged into the regions, a position sequence of the cells in each region can be determined. According to the position sequence, the cells can be rearranged within each region evenly.

Going through steps 421A, 421B, 421C, and 421D, the simulated IC design layout can be generated, where the cell congestions therein can be eliminated. In some embodiments, steps 421A, 421B, 421C, and 421D can be performed on the simulated IC design layout generated in operation 413 to alleviate congestion.

In operation 422, an updated simulated IC design layout is generated by performing a set of calculations on the simulated IC design layout generated in operation 421. In some embodiments, calculations are performed on the simulated IC design layout to reduce a total wire length thereof. That is, a total wire length of the simulated IC design layout generated in operation 422 is less than that of the simulated IC design layout generated in operation 421. In other words, operation 422 adjusts the simulated IC design layout generated in operation 421 to reduce total wire length thereof. In some embodiments, the simulated IC design layout can be adjusted utilizing the B2B model to update the connection to reduce the wire length.

In operation 423, it is determined whether the simulated IC design layout conforms to a convergence criterion. If so, such layout can be obtained. If not, operations 421 and 422 can be repeated. In operation 423, operations 421 and 422 may be iterated until the simulated IC design layout conforms to the convergence criterion. In some embodiments, the convergence criterion may include the total wire length, the congestion, or other parameters related to the performance of the simulated IC design layout.

In some embodiments, the convergence criterion can be a ratio of the wire length of the look-ahead legalization (LAL) to the wire length of the B2B model. The wire length of LAL represents the wire length of the layout generated in operation 421. The wire length of B2B model represents the wire length of the layout generated in operation 422. In some embodiments, the wire length can be determined by HPWL method. In some embodiments, the convergence criterion a can be expressed by Eq. 2 as follows.

$$\sigma = \frac{|W_{LAL} - W_{B2B}|}{W_{B2B}}, \qquad [\text{Eq. 2}]$$

in which $W_{LAL}$ represents the wire length of LAL; $W_{B2B}$ represents the wire length of B2B.

The convergence criterion $\sigma$ is checked in operation 423. In some embodiments, operations 421 and 422 may be iterated until the convergence criterion $\sigma$ is less than a predetermined value. In some embodiments, the convergence criterion $\sigma$ can be less than or equal to 0.03.

In operation 424, a global placement of the simulated IC design layout can be obtained. That is, the refinement placement 420 is completed. In some embodiments, the result of the refinement placement 420 can be a final version of the global placement 231. In some embodiments, the result of the refinement placement 420 can be the basis on which to perform subsequent operations as shown in FIG. 2.

Figure 5:
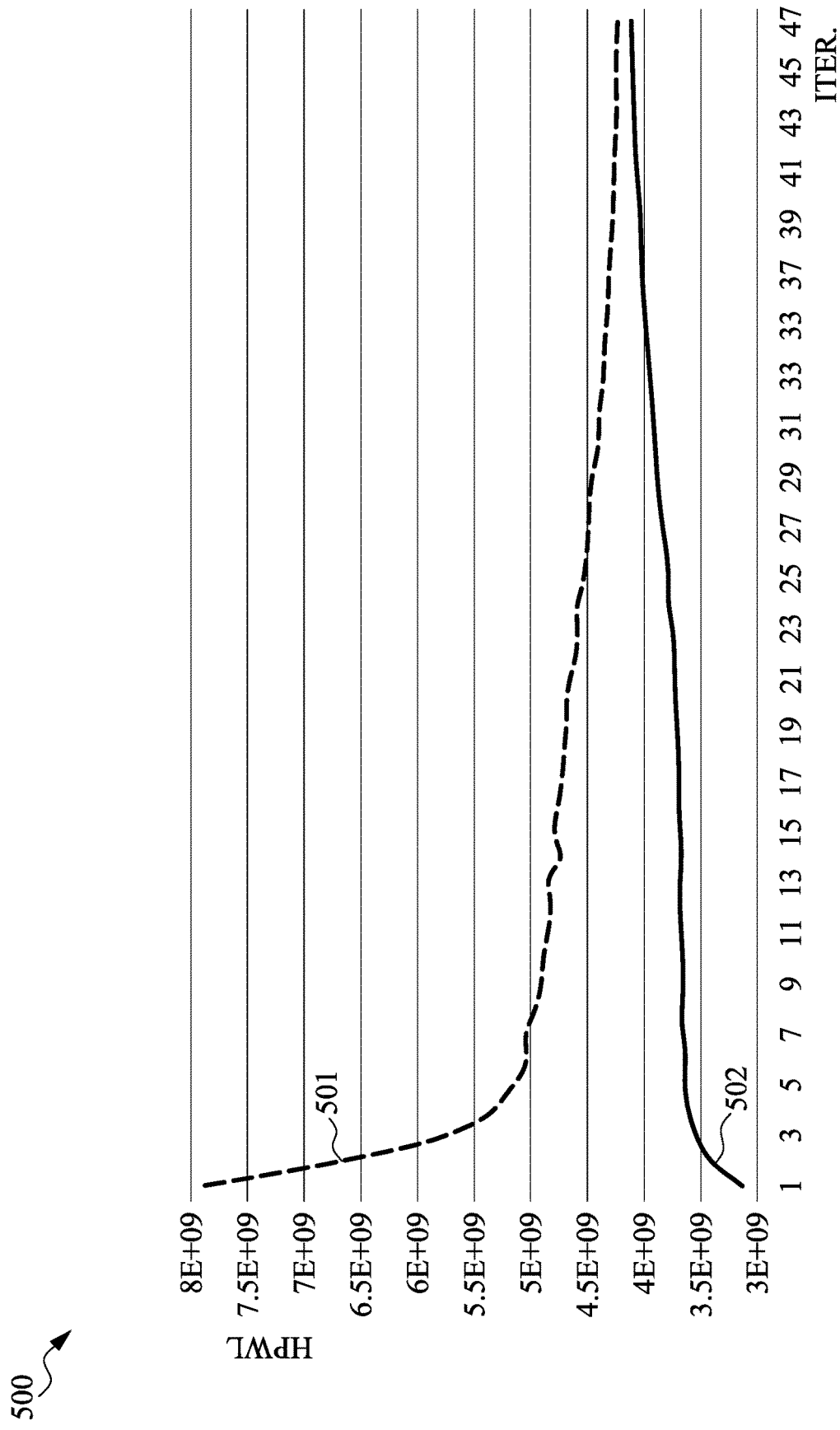
FIG. 5 is a graph illustrating the wire length of the layout versus the number of iteration, in accordance with some embodiments of the present disclosure.

FIG. 5 is a graph 500 illustrating the wire length (HPWL) of the layout versus the number of iterations, in accordance with some embodiments. Referring to FIG. 5, the x-axis represents the number of iterations of operations 421 and 422 in FIG. 4. The y-axis represents the wire length of the simulated IC design layout. The line 501 represents the result of LAL, and the line 502 represents the result of B2B. That is, the line 501 represents the result of operation 421, and the line 502 represents the result of operation 422.

As illustrated, the lines 501 and 502 will be closer when the number of iterations is sufficient. In some embodiments, the lines 501 and 502 are close enough when the number of iteration exceeds forty. That is, the difference between lines 501 and 502 is small enough when the number of iteration exceeds forty. With the increasing iteration, the convergence is approaching. When the lines 501 and 502 are close enough, it represents that the simulated IC design layout meets the convergence criterion.

Figure 6A:
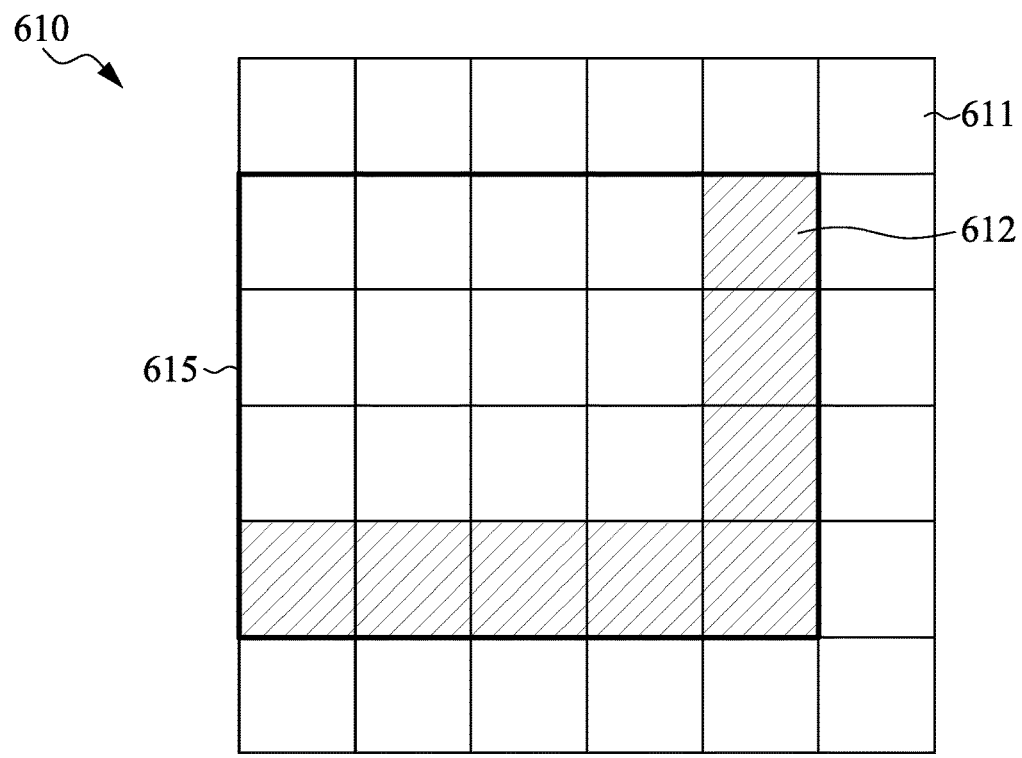
FIGS. 6A and 6B are top views of a simulated IC design layout, in accordance with some embodiments of the present disclosure.
Figure 6B:
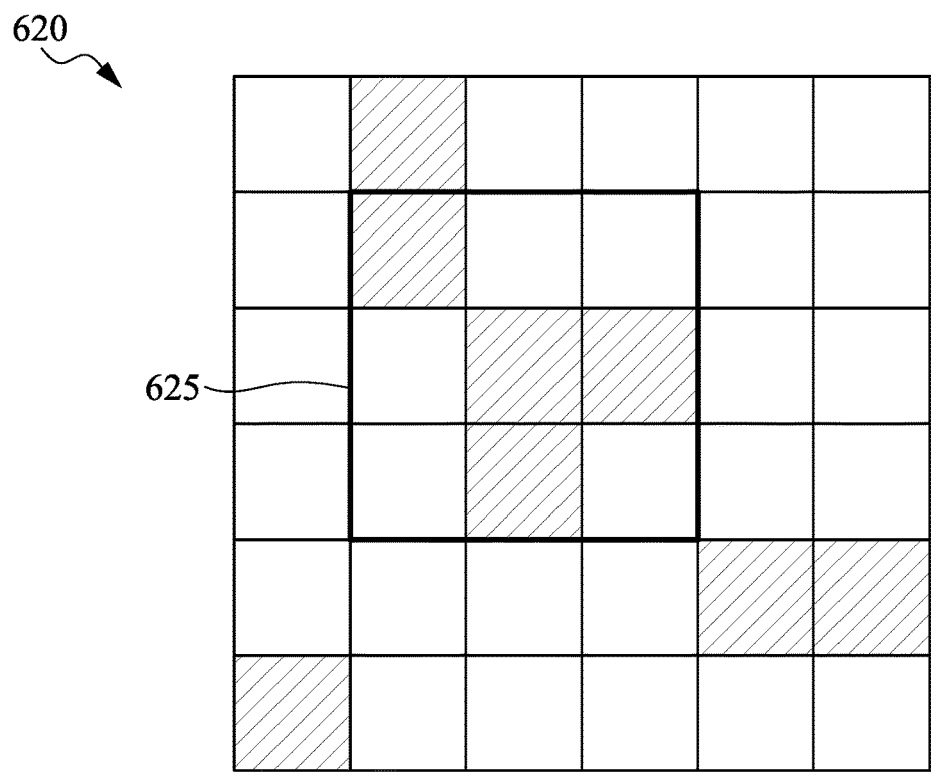

FIGS. 6A and 6B are top views of a simulated IC design layout, in accordance with some embodiments of the present disclosure. FIGS. 6A and 6B are examples of the simulated IC design layout of steps 421E in FIG. 4, As shown in FIG. 6A, the simulated IC design layout 610 can be divided into several regions. In one embodiment, the layout 610 can include 36 regions. In some embodiments, the layout 610 can include cells 611, congested regions 612, and a window 615. In some embodiments, the cells 611 do not meet a congestion criterion and thus are determined as normal regions. The congested regions 612 can be identified according to step 421A. In some embodiments, the congested regions 612 include lots of net connections therein. That is, the congested regions 612 may include multiple cells inside and overlapped with each other.

In some embodiments, the window 615 is determined based on the congested regions 612. In one embodiment, the window 615 can be a rectangular area. The window 615 can have at least one region. For example, the window 615 includes 20 regions. In another embodiment, the regions in the window 615 can be arranged in a matrix. For example, the window 615 has a matrix having a size of 4×5. In some embodiments, the window 615 can include 8 congested regions 612. In some embodiments, the congested region 612, which has the most serious congestion can be identified so that the window 615 can be determined. The congested region 612 can be eliminated by rearranging the cells in the window 615 evenly.

Referring to FIG. 6B, simulated IC design layout 620 is similar to simulated IC design layout 610 in FIG. 6A, differing therefrom in that in FIG. 6B, the window 625 is different from the window 615 in FIG. 6A. In some embodiments, the layout 620 includes normal regions and congested regions. The layout 620 may include 8 congested regions. In some embodiments, the window 625 of the layout 620 can include 9 regions. That is, the window 625 can have a matrix having a size of 3×3. The window 625 may include 4 congested regions. In some embodiments, the most congested region can be the center of the window 625. In some embodiments, the window size is preferably not more than 3×3, With larger window, relocation of cells will be far from the original position. With distant relocation of cells, wire length may be increased as well.

FIGS. 7A, 7B, 7C, and 7D are top views of a simulated IC design layout, in accordance with some embodiments of the present disclosure. FIGS. 7A-7D show detail of steps 421C in FIG. 4.

Figure 7A:
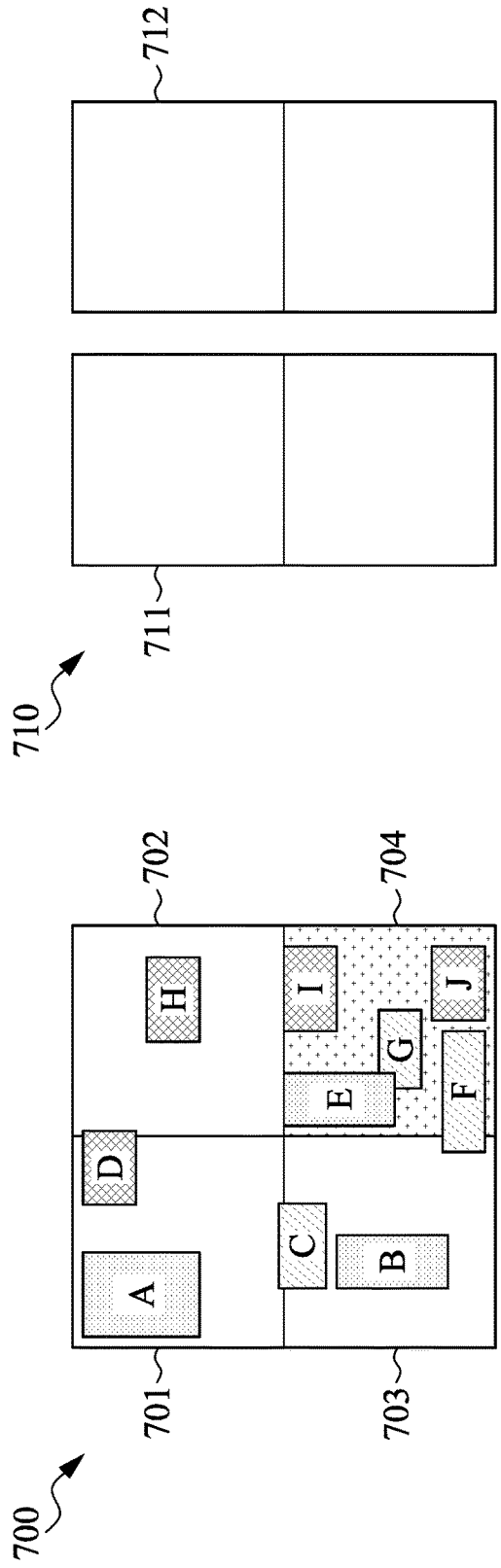
FIGS. 7A, 7B, 7C, and 7D are top views of a simulated IC design layout, in accordance with some embodiments of the present disclosure.

Referring to FIG. 7A, the layout 700 can be also referred to as a window 700. The window 700 includes regions 701, 702, 703, and 704. As shown in FIG. 7A, the window 700 can include ten cells A, B, C, D, E, F, G, H, I, and J. In some embodiments, the region 701 can include cells A and D. The region 702 can include the cell H. The region 703 can include the cells B and C. The region 704 can include the cells E, F, G, I, and J. In some embodiments, the region 704 can be the congested region since it includes the most cells (i.e., 5 cells). In some embodiments, the cells A, B, C, D, E, F, G, H, I, and J may be overlapped to each other in window 700.

Figure 7B:
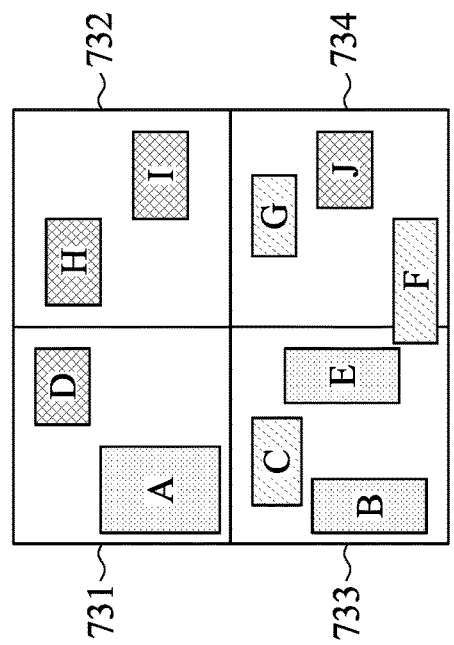

As shown in FIG. 7B, the window 710 can be divided into two sub-windows 711 and 712. In some embodiments, the window 710 is substantially identical to the window 700 in FIG. 7A. In some embodiments, the window 710 can be divided vertically. The window 710 may be divided into two or more sub-windows. In some embodiments, the sub-window 711 can include two regions. The sub-window 712 can include two regions.

To rearrange the cells into the sub-windows, a position sequence of the cells in horizontal orientation can be determined. For example, the position of cells can be obtained and compared to derive the position sequence. In some embodiments, the position sequence of the cells in horizontal orientation can be determined, for example, by comparing the x-coordinates of the geometric center of the cells. Referring to FIG. 7A, the horizontal position sequence of the cells may be A, B, C, D, E, F, G, H, I, and J. Therefore, the cells can be divided into two groups, where the number of groups may correspond to the number of sub-windows. The cells can be rearranged into the sub-windows based on the position sequence. For example, the cells A, B, C, D, and F can be placed in the sub-window 711, and the cells F, G, H, I, and J can be placed in the sub-window 712. Based on the position sequence in horizontal orientation, the cells A, B, C, D, F, F, G, H, I, and J can be rearranged into the sub-windows 711 and 712 evenly.

In some embodiments, the vertical position sequence of the cells in the sub-windows 711 and 712 can also be obtained. In some embodiments, the position sequence of the cells in vertical orientation can be determined, for example, by comparing the y-coordinates of the geometric center of the cells. For example, the sub-window 711 can include the horizontal position sequence of the cells in A, B, C, D, and E, and the vertical position sequence of the cells in D, A, C, E, and B. In some embodiments, the sub-window 712 can include the horizontal position sequence of the cells in F, G, H, I, and J, and the vertical position sequence of the cells in H, I, G, J, and F.

Figure 7C:
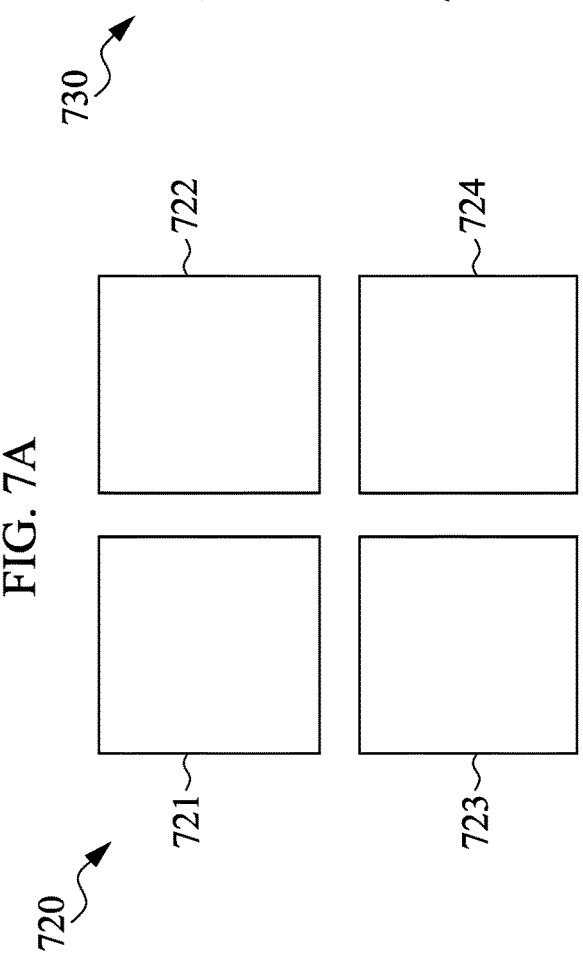

Referring to FIG. 7C, the window 720 can be divided into four sub-windows 721, 722, 723, and 724. In some embodiments, the window 720 is substantially identical to the window 700 in FIG. 7A. In some embodiments, the window 720 can be divided horizontally and vertically. In some embodiments, each of the sub-windows 711 and 712 in FIG. 7B can be divided horizontally into two sub-windows 721, 722, 723, and 724. Each of the sub-windows 721, 722, 723, 724 may include at least one region. For example, the sub-windows 721, 722, 723, and 724 can have a size identical to that of the regions. Therefore, the sub-windows 721, 722, 723, and 724 can also be referred to as regions 721, 722, 723, and 724.

Based on the result in FIG. 7B, a position sequence of the cells in vertical orientation can be determined for rearranging the cells into the sub-windows 721, 722, 723, and 724. For example, the position of cells can be obtained and compared to derive the vertical position sequence. Referring to FIG. 7A, the vertical position sequence of the cells may be F, J, B, G, C, A, and D. Therefore, the cells can be rearranged into the sub-windows based on the position sequence evenly in vertical orientation. Since the sub-window 711 (divided into the sub-windows 721 and 723) include the cells A, B, C, D, and E, the vertical position sequence can be D, A, C, F, and B. Accordingly, the cells D and A can be placed in the sub-window 721, and the cells C, E, and B can be placed in the sub-window 723. Similarly, including the cells F, G, H, I, and J in the sub-window 712 (divided into the sub-windows 722 and 724), the vertical position sequence can be H, I, G, J, and F. Accordingly, the cells H and I can be placed in the sub-window 722, and the cells G, J, and F can be placed in the sub-window 724.

In some embodiments, the division of the window and the rearrangement of the cells into the sub-windows can be iterated until each sub-window has a size identical to that of the region. When the window is divided enough, the cells can be distributed in the window evenly.

Figure 7D:

FIG. 7D shows a result of a simulated IC design layout after division and rearrangement shown in FIGS. 7B and 7C are performed. The window 730 includes sub-windows 731, 732, 733, and 734. Sub-windows 731, 732, 733, and 734 can be of a size identical to that of the regions. The sub-window 731 can include the cells A and D. The sub-window 732 can include the cells H and I. The sub-window 733 can include B, C, and E. The sub-window 734 can include F, G, and J. Comparing to the layout in FIG. 7A, the sub-windows 731, 732, 733, and 734 have a relative average cells therein. That is, the cells A, B, C, D, E, F, G, H, I, and J are rearranged in the window 730 evenly. In some embodiments, the cells A, B, C, D, E, F, G, H, I, and J may still overlap in window 730. Such overlap is acceptable in global placement stage.

Figure 8A:
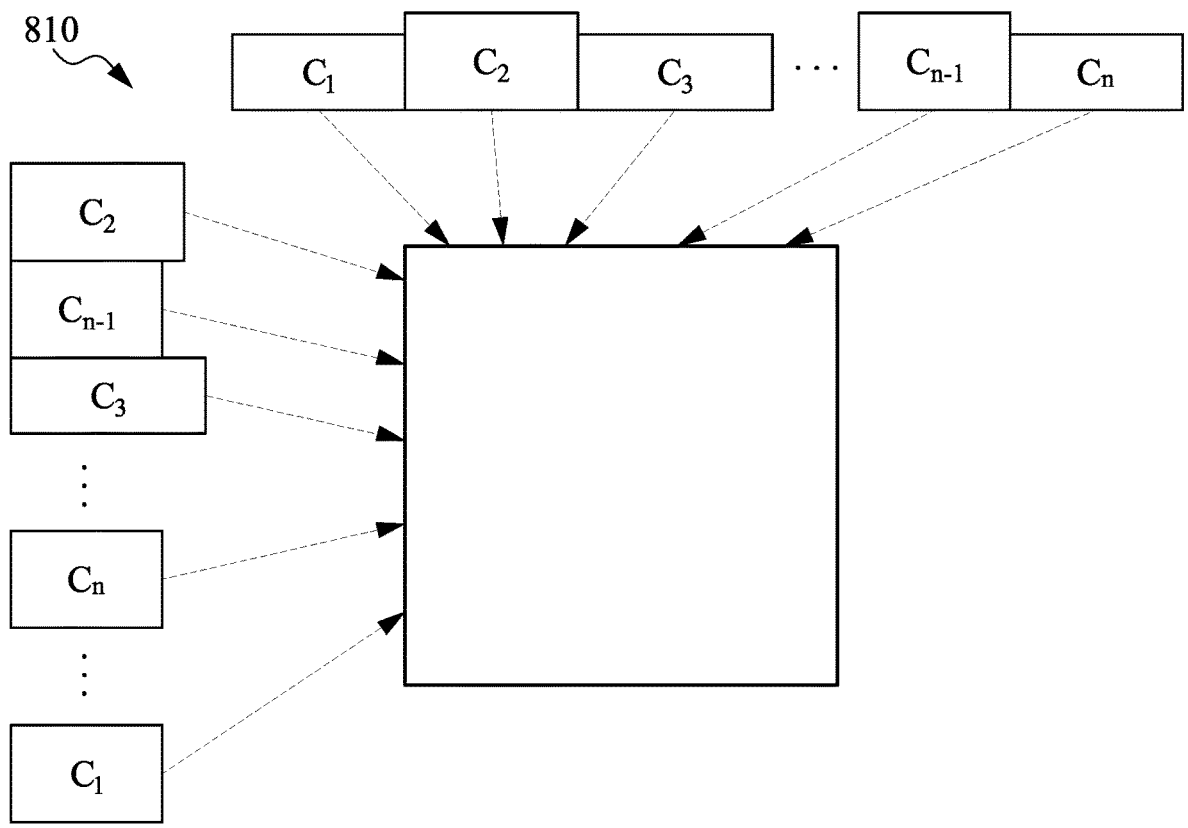
FIGS. 8A and 8B are top views of a simulated IC design layout, in accordance with some embodiments of the present disclosure.
Figure 8B:
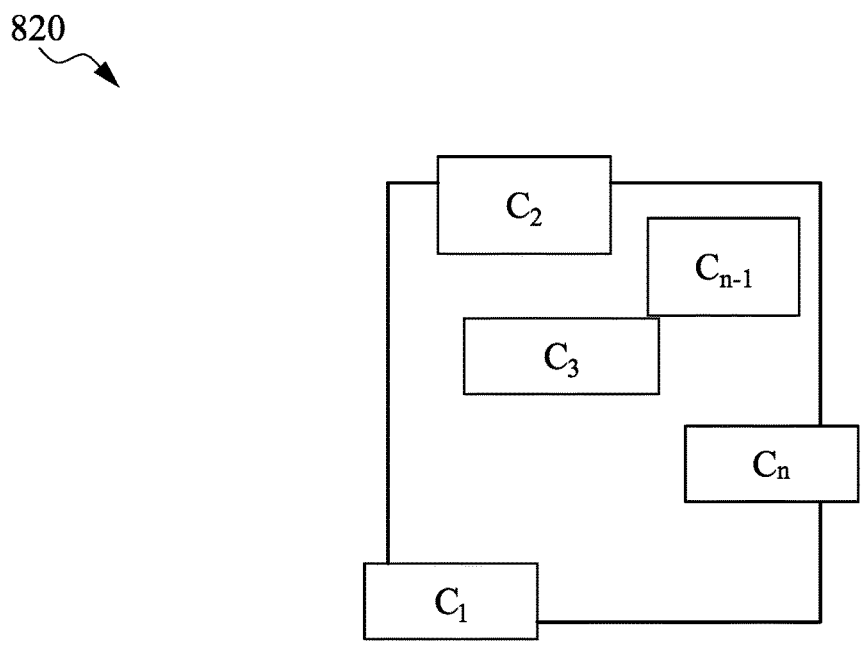

FIGS. 8A and 8B are top views of a simulated IC design layout, in accordance with some embodiments of the present disclosure. FIGS. 8A and 8B shows details of steps 421D in FIG. 4 to rearrange the cells within a region evenly.

As shown in FIG. 8A, the region 810 includes one or more cells. For example, the region 810 can include a number "n" of cells. After relocating each cell to a specific region according to FIGS. 7A-7D, each cell can be rearranged in the region, Each cell can have a new position based on its current width/height and the number of cells.

To rearrange the cells within the region, a position sequence of the cells in the region can be obtained. In some embodiments, the position sequence can be vertical or horizontal. For example, the horizontal position sequence of the cells can be $C_1, C_2, C_3, C_3, \ldots C_{n-1}$, and $C_n$ as shown in region 810 in FIG. 8A. The vertical position sequence of the cells can be $C_2, C_{n-1}, C_3, \ldots C_n, \ldots C_1$ as shown in left of the region 810 in FIG. 8A.

For example, the new horizontal position can be calculated by Eq. 3 as follows.

$$x_i = b_x + \frac{\sum_{j=1}^{i-1} w_i}{\sum_{k=1}^{n} w_k} \times b_{width}, \text{ for } 1 \le i \le n, \quad [\text{Eq. 3}]$$

in which $x_i$ represents the final horizontal position corresponding to cell list $C_1, C_2, \ldots C_n$ as shown in FIG. 8A; $w_i$ represents the width of the cell $C_i$; $b_x$ represents the left boundary position coordinate of the region, and $b_{width}$ represents the width of the region. In some embodiments, the new vertical position can be similarly calculated according to Eq. 3.

FIG. 8B shows a result of a simulated IC design layout according to step 421D in FIG. 4. The region 820 may be similar to the region 810 in FIG. 8A, while the cells in 820 is rearranged according to the method mentioned. Accordingly, with the new position of derived from the cells in the region 810, the cells can be evenly rearranged within region 820.

FIGS. 9A, 9B, 9C, 9D, 9E and 9F are graphs showing the distribution of elements in a simulated IC design layout, in accordance with some embodiments of the present disclosure. In one embodiments, the black spots may represent the elements in the layout. For example, the black spots can represent the functional blocks in the layout.

Figure 9E:
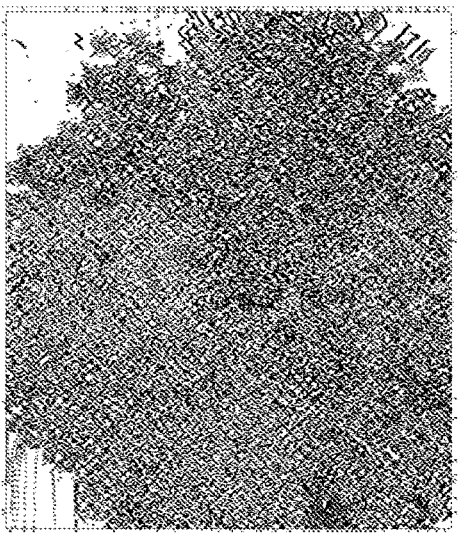
FIGS. 9A, 9B, 9C, 9D, 9E and 9F are graphs showing the distribution of elements in a simulated IC design layout, in accordance with some embodiments of the present disclosure.
Figure 9F:
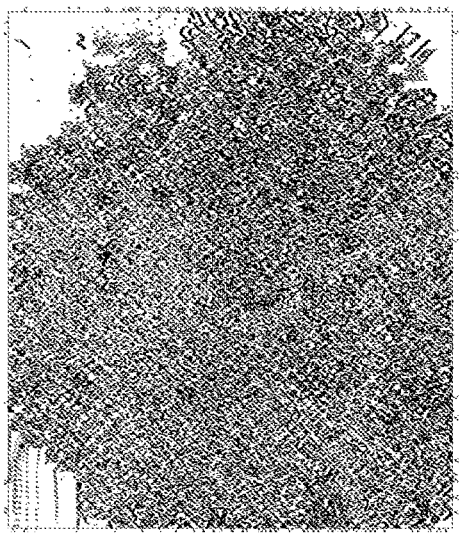
Figure 9C:
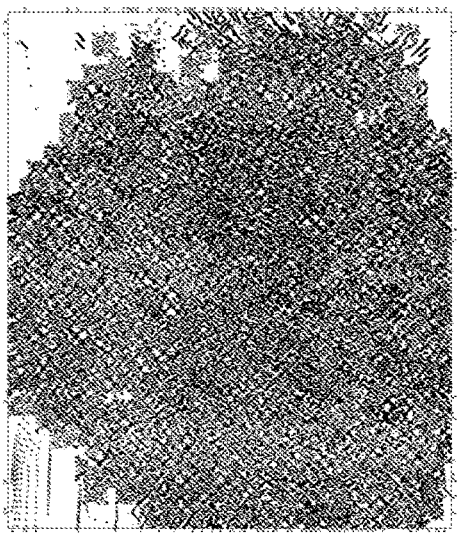
Figure 9D:
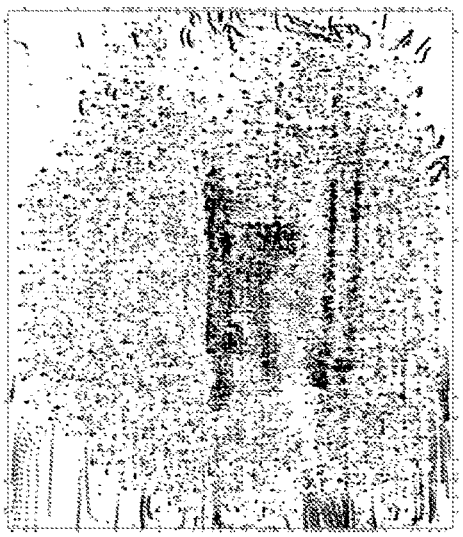
Figure 9A:
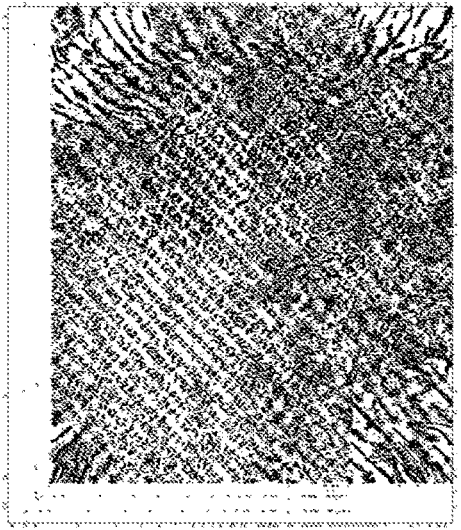
Figure 9B:
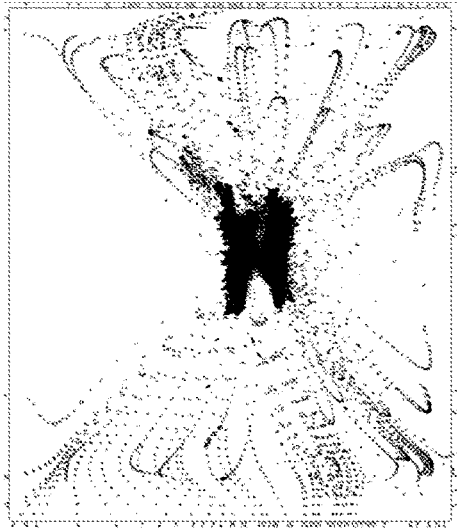

FIG. 9A shows a distribution of a result of the simulated IC design layout generated by operation 421 in FIG. 4. FIG. 9B shows a distribution of a result of the simulated IC design layout generated by operation 422 in FIG. 4.

FIG. 9C shows a distribution of a result of the simulated IC design layout generated by operation 421 in FIG. 4, where operation 421 can be iterated 20 times. FIG. 9D shows a distribution of a result of the simulated IC design layout generated by operation 422 in FIG. 4, where operation 422 can be iterated 20 times. After 20 iterations, the distribution difference between the FIGS. 9C and 9D is less than that between FIGS. 9A and 9B.

FIG. 9E shows a distribution of a result of the simulated IC design layout generated by operation 421 in FIG. 4, where operation 421 can be iterated more than 40 times, FIG. 9F shows a distribution of a result of the simulated IC design layout generated by operation 422 in FIG. 4, where operation 422 can be iterated more than 40 times. After 40 iterations, the layout may meet the convergence criterion, Therefore, the distribution difference between the FIGS. 9E and 9F is less than that between FIGS. 9C and 9D, and less than that between FIGS. 9A and 9B.

Referring back to FIG. 5, the trend of convergence can be derived with the number of iterations. Similarly, FIGS. 9A-9F are distribution simulations corresponding to the number of iterations, showing that the layout can be balanced between reducing wire length and removing overlap of cells.

Figure 10:
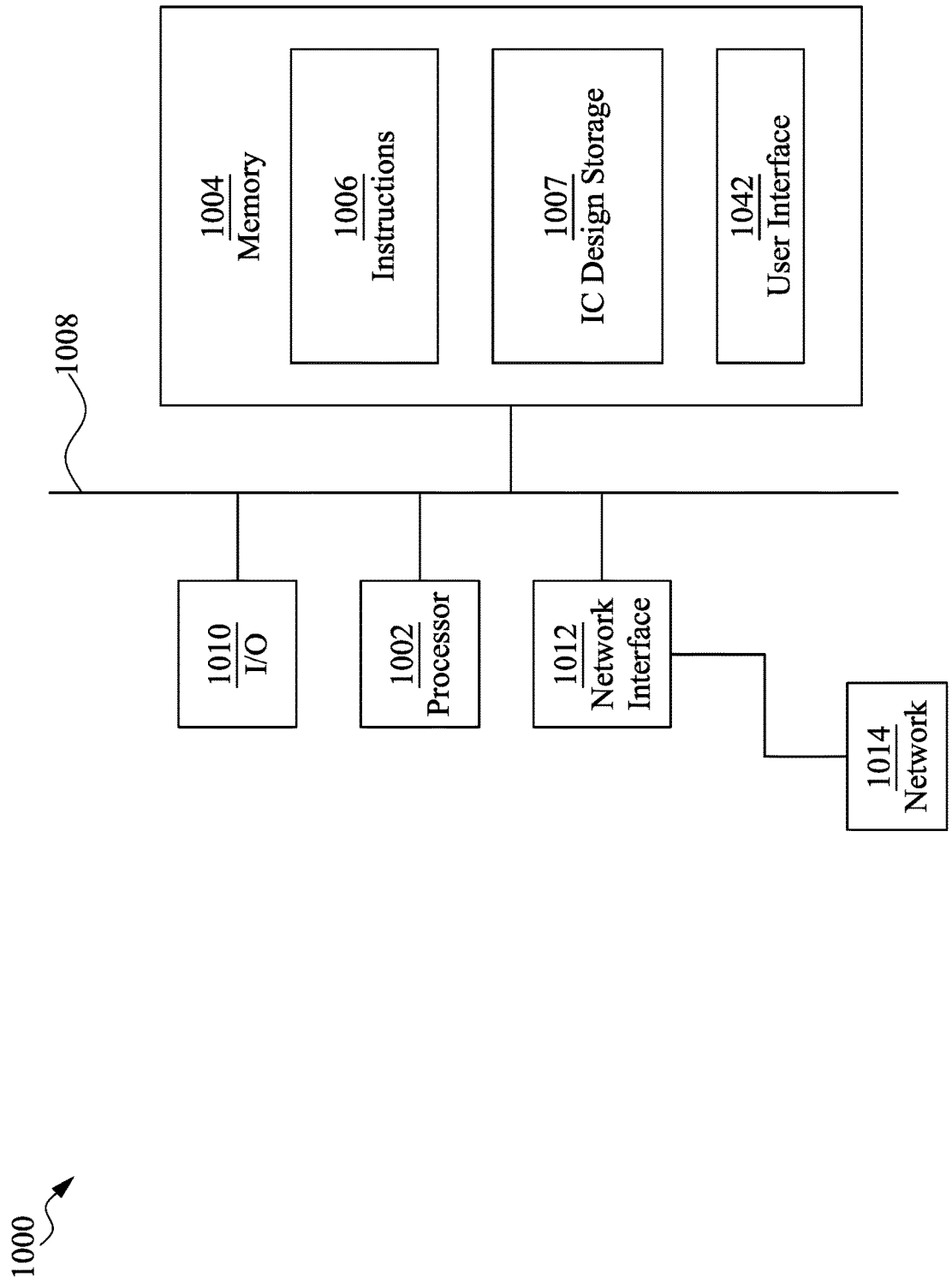
FIG. 10 is a block diagram of an IC layout diagram generation system, in accordance with some embodiments.

FIG. 10 is a block diagram of IC design system 1000, in accordance with some embodiments. Methods described herein of designing IC layout diagrams in accordance with one or more embodiments are implementable, for example, using IC design system 1000, in accordance with some embodiments. In some embodiments, IC design system 1000 can be an APR system, can include an APR system, or can be a part of an APR system, usable for performing an APR method.

In some embodiments, IC design system 1000 includes a processor 1002 and non-transitory, computer-readable memory 1004. Memory 1004, amongst other things, is encoded with, i.e., stores, computer program code, i.e., a set of executable instructions 1006. Execution of instructions 1006 by the processor 1002 represents (at least in part) an EDA tool which implements a portion or all of a method, e.g., a method of generating an IC layout diagram described above (hereinafter, the noted processes and/or methods).

Processor 1002 is electrically coupled to computer-readable memory 1004 via a bus 1008. Processor 1002 is also electrically coupled to an I/O interface 1010 by bus 1008. Network interface 1012 is also electrically connected to processor 1002 via bus 1008. Network interface 1012 is connected to a network 1014, so that processor 1002 and computer-readable memory 1004 are capable of connecting to external elements via network 1014. Processor 1002 is configured to execute instructions 1006 encoded in computer-readable memory 1004 in order to cause IC design system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, memory 1004 is an electronic, magnetic, optical, electromagnetic, infrared, and/or a semiconductor system (or apparatus or device). For example, memory 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, memory 1004 includes a compact disk-read only memory (CD-ROM), a compact disk-read/write (CD-R/W), and/or a digital video disc (DVD).

In one or more embodiments, memory 1004 stores instructions 1006 configured to cause IC design system 1000 (where such execution represents (at least in part) the EDA tool) to be usable for performing a portion or all of the noted processes and/or methods. In one or more embodiments, memory 1004 also stores information which facilitates performing a portion or all of the noted processes and/or methods. In one or more embodiments, memory 1004 includes IC design storage 1007 configured to store one or more IC layout diagrams.

IC design system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

IC design system 1000 also includes network interface 1012 coupled to processor 1002. Network interface 1012 allows IC design system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1000.

IC design system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. IC design system 1000 is configured to receive information related to a UI through I/O interface 1010. The information is stored in memory 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
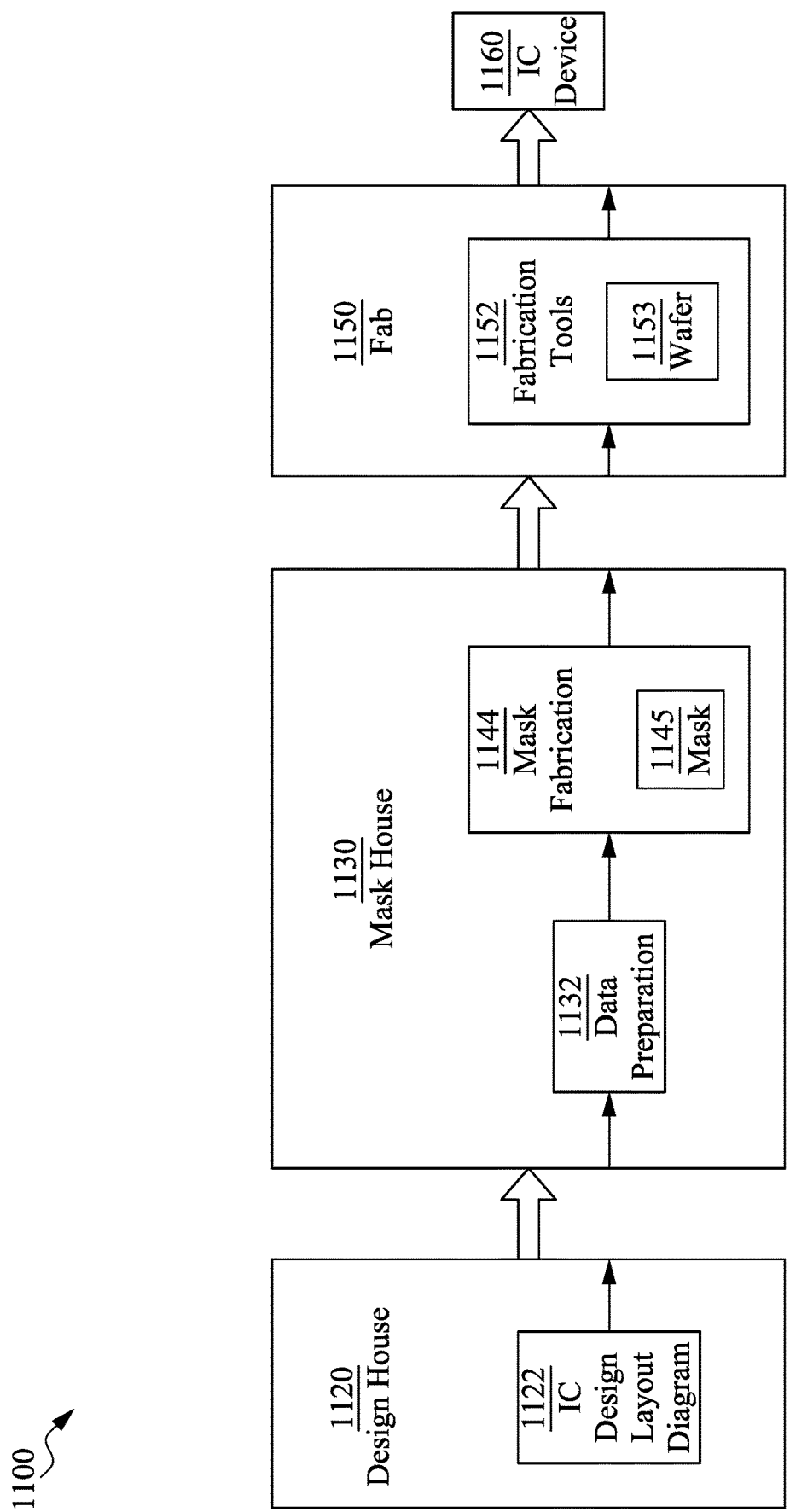
FIG. 11 is a block diagram of an IC manufacturing system, and an IC manufacturing flow associated therewith, in accordance with some embodiments.

FIG. 11 is a block diagram of IC manufacturing system 1100, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns, e.g., an IC layout diagram discussed above. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings fir bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front-end fabrication of a plurality of IC products (front-end-of line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes wafer fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using masks) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

According to some embodiments, a method for arranging electrical components within a semiconductor device is provided. The method includes (a) placing a plurality of cells in a first layout; (b) generating a second layout by performing a first set of calculations on the first layout such that a total wire length of the second layout is less than that of the first layout; (c) generating a third layout by performing a second set of calculations on the second layout such that cell congestions in the second layout is eliminated from the third layout; (d) generating a fourth layout by performing a third set of calculations on the third layout such that the total wire length of the fourth layout is less than that of the third layout; and (e) iterating the operations (c) and (d) until a target layout conforming a convergence criterion.

According to other embodiments, a non-transitory computer-readable medium is provided. The non-transitory computer-readable medium stores computer-executable instructions executed on a computer system for arranging electrical components within a semiconductor device. The computer-executable instructions (a) placing a plurality of cells in a first layout; (b) generating a second layout by performing a first set of calculations on the first layout such that a total wire length of the second layout is less than that of the first layout; (c) generating a third layout by performing a second set of calculations on the second layout such that cell congestions in the second layout is eliminated from the third layout; (d) generating a fourth layout by performing a third set of calculations on the third layout such that the total wire length of the fourth layout is less than that of the third layout; and (e) iterating the operations (c) and (d) until a target layout conforming a convergence criterion. Wherein the operation (c) further includes determining a first window according to a congestion status; rearranging the cells in the first window evenly.

According to other embodiments, an apparatus for arranging electrical components within a semiconductor device. The apparatus includes at least one non-transitory computer-readable medium having stored thereon computer-executable instructions; and at least one processor coupled to the at least one non-transitory computer-readable medium. Wherein the computer-executable instructions are executable by the at least one processor and cause the apparatus to (a) place a plurality of cells in a first layout; (b) generate a second layout by performing a first set of calculations on the first layout such that a total wire length of the second layout is less than that of the first layout; (c) generate a third layout by performing a second set of calculations on the second layout such that cell congestions in the second layout is eliminated from the third layout; (d) generate a fourth layout by performing a third set of calculations on the third layout such that the total wire length of the fourth layout is less than that of the third layout; and (e) iterate the operations (c) and (d) until a target layout conforming a convergence criterion.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method for arranging electrical components within a semiconductor device, comprising:
    (a) placing a plurality of cells in a first layout;
    (b) generating a second layout by performing a first set of calculations on the first layout such that a total wire length of the second layout is less than that of the first layout;
    (c) generating a third layout by performing a second set of calculations on the second layout such that cell congestions in the second layout is eliminated from the third layout;
    (d) generating a fourth layout by performing a third set of calculations on the third layout such that the total wire length of the fourth layout is less than that of the third layout; and
    (e) iterating the operations (c) and (d) until a target layout conforming a convergence criterion.

2. The method of claim 1, wherein the second set of calculations comprises:
    determining a first window according to a congestion status; and
    rearranging the cells in the first window evenly.

3. The method of claim 2, wherein the second set of calculations further comprises:
    dividing the second layout into a plurality of regions, wherein each of the plurality of regions includes at least one of the plurality of cells;
    identifying a first congested region of the plurality of regions in the second layout, wherein the first congested region meets a congestion criterion;
    wherein the first window is determined based on the first congested region, wherein the first window includes one or more of the plurality of regions, and wherein the cells are rearranged into the regions of the first window.

4. The method of claim 3, wherein the second set of calculations further comprises:
    rearranging the cells within each of the regions of the first window evenly.

5. The method of claim 3, wherein the regions in the first window are arranged in a matrix.

6. The method of claim 5, wherein the matrix has a size of 3×3.

7. The method of claim 3, wherein the operation of rearranging the cells into the regions of the first window further comprises:
    (i) dividing the first window into two sub-windows along a first direction;
    (ii) determining a position sequence of the cells in a second direction perpendicular with the first direction;
    (iii) rearranging the cells into the sub-windows based on the first sequence evenly in the second direction.

8. The method of claim 7, wherein the operations (i) to (iii) are iterated until each sub-window having a size identical to that of the region.

9. The method of claim 1, wherein the first layout includes a first portion and a second portion adjacent to the first portion, and wherein the first portion has a first height different from a second height of the second portion.

10. The method of claim 9, wherein the first height of the first portion of the first layout exceeds the second height of the second portion of the first layout.

11. The method of claim 1, further comprising:
legalizing the target layout;
providing a clock unit in the target layout;
routing the cells and the clock unit in the target layout; and
generating a tape out file for manufacturing the semiconductor device according to the target layout.

12. A non-transitory computer-readable medium, storing computer-executable instructions executed on a computer system for arranging electrical components within a semiconductor device, wherein the method comprises:
(a) placing a plurality of cells in a first layout;
(b) generating a second layout by performing a first set of calculations on the first layout such that a total wire length of the second layout is less than that of the first layout;
(c) generating a third layout by performing a second set of calculations on the second layout such that cell congestions in the second layout is eliminated from the third layout, including:
determining a first window according to a congestion status;
rearranging the cells in the first window evenly;
(d) generating a fourth layout by, performing a third set of calculations on the third layout such that the total wire length of the fourth layout is less than that of the third layout; and
(e) iterating the operations (c) and (d) until a target layout conforming a convergence criterion.

13. The non-transitory computer-readable medium of claim 12, wherein the second set of calculations further comprises:
dividing the second layout into a plurality of regions, wherein each of the plurality of regions includes at least one of the plurality of cells;
identifying a first congested region of the plurality of regions in the second layout, wherein the first congested region meets a congestion criterion;
wherein the first window is determined based on the first congested region, wherein the first window includes one or more of the plurality of regions, and wherein the cells are rearranged into the regions of the first window.

14. The non-transitory computer-readable medium of claim 13, wherein the second set of calculations further comprises evenly rearranging the cells within each of the regions of the first window.

15. The non-transitory computer-readable medium of claim 13, wherein the regions in the first window are arranged in a matrix.

16. The non-transitory computer-readable medium of claim 13, wherein the operation of rearranging the cells into the regions of the first window further comprises:

(i) dividing the first window into two sub-windows along a first direction;
(ii) determining a position sequence of the cells in a second direction perpendicular with the first direction;
(iii) rearranging the cells into the sub-windows based on the first sequence evenly in the second direction.

17. The non-transitory computer-readable medium of claim 16, wherein the operations (i) to (iii) are iterated until each sub-window having a size identical to that of the region.

18. The non-transitory computer-readable medium of claim 12, wherein the first layout includes a first portion and a second portion adjacent to the first portion, and wherein the first portion has a first height different from a second height of the second portion.

19. An apparatus for arranging electrical components within a semiconductor device, comprising:
at least one non-transitory computer-readable medium having stored thereon computer-executable instructions; and
at least one processor coupled to the at least one non-transitory computer-readable medium, wherein the computer-executable instructions are executable by the at least one processor and cause the apparatus to:
(a) place a plurality of cells in a first layout;
(b) generate a second layout by performing a first set of calculations on the first layout such that a total wire length of the second layout is less than that of the first layout;
(c) generate a third layout by performing a second set of calculations on the second layout such that cell congestions in the second layout is eliminated from the third layout;
(d) generate a fourth layout by performing a third set of calculations on the third layout such that the total wire length of the fourth layout is less than that of the third layout; and
(e) iterate the operations (c) and (d) until a target layout conforming a convergence criterion.

20. The apparatus of claim 19, wherein the second set of calculations further comprises:
dividing the second layout into a plurality of regions, wherein each of the plurality of regions includes at least one of the plurality of cells;
identifying a first congested region of the plurality of regions in the second layout, wherein the first congested region meets a congestion criterion;
determining a first window based on the first congested region, wherein the first window includes one or more of the plurality of regions; and
rearranging the cells of the first window into the regions of the first window.

* * * * *